US 6,559,086 B1

(12) United States Patent
Takahashi et al.

(10) Patent No.: US 6,559,086 B1
(45) Date of Patent: May 6, 2003

(54) EXHAUST EMISSION CONTROL CATALYST

(75) Inventors: Hiroaki Takahashi, Toyota (JP);
Toshihiro Takada, Toyota (JP); Saeko Kurachi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/486,819

(22) PCT Filed: Sep. 9, 1998

(86) PCT No.: PCT/JP98/04072

§ 371 (c)(1),
(2), (4) Date: Mar. 2, 2000

(87) PCT Pub. No.: WO99/13981

PCT Pub. Date: Mar. 25, 1999

(30) Foreign Application Priority Data

Sep. 12, 1997 (JP) .............................. 9-248705
Sep. 12, 1997 (JP) .............................. 9-248712
Oct. 7, 1997 (JP) .............................. 9-274299

(51) Int. Cl.$^7$ .................. B01J 21/00; B01J 29/00; B01J 29/18; B01J 29/08
(52) U.S. Cl. .................. 502/74; 502/77; 502/78; 502/79
(58) Field of Search .................. 502/66, 67, 71, 502/74, 77, 78, 79, 527.12, 527.15

(56) References Cited

U.S. PATENT DOCUMENTS

| | | | | |
|---|---|---|---|---|
| 4,097,410 A | * | 6/1978 | Gladrow | 252/455 Z |
| 4,661,239 A | * | 4/1987 | Steigleder | 208/111 |
| 4,980,328 A | * | 12/1990 | Kukes et al. | 502/67 |
| 5,443,803 A | * | 8/1995 | Mizuno et al. | 423/213.2 |
| 5,905,051 A | * | 5/1999 | Wu et al. | 502/60 |
| 5,993,642 A | * | 11/1999 | Mohr et al. | 208/46 |
| 6,040,259 A | * | 3/2000 | Mohr et al. | 502/67 |
| 6,093,378 A | * | 7/2000 | Deeba et al. | 423/213.5 |
| 6,198,013 B1 | * | 3/2001 | Mohr et al. | 585/475 |

FOREIGN PATENT DOCUMENTS

| | | |
|---|---|---|
| EP | 0 666 103 A1 | 8/1995 |
| EP | 0 852 966 A1 | 7/1998 |
| JP | A-2-135126 | 5/1990 |
| JP | A-2-222727 | 9/1990 |
| JP | 4-219146 | 8/1992 |
| JP | A-4-267951 | 9/1992 |
| JP | A-5-49933 | 3/1993 |
| JP | 5-168943 | 7/1993 |
| JP | A-5-228370 | 9/1993 |
| JP | A-5-285392 | 11/1993 |
| JP | A-6-327980 | 11/1994 |
| JP | A-7-51542 | 2/1995 |
| JP | A-7-155613 | 6/1995 |
| JP | A-9-215926 | 8/1997 |
| JP | A-10-225635 | 8/1998 |

* cited by examiner

Primary Examiner—Stanley S. Silverman
Assistant Examiner—Cam N. Nguyen
(74) Attorney, Agent, or Firm—Oliff & Berridge, PLC

(57) ABSTRACT

An exhaust-gas-purifying catalyst wherein a first zeolite loaded with a catalyst metal and a second zeolite unloaded with a catalyst metal are mixed. By actively adsorbing HC onto the second zeolite, it is possible to inhibit the catalyst metal loaded on the first zeolite from being poisoned by HC, and to sufficiently adsorb HC. Accordingly, since the HC adsorbing capability is improved, and since the HC poisoning of the catalyst metal is suppressed, the $NO_x$ purifying capability is enhanced and the durability is also upgraded.

10 Claims, 3 Drawing Sheets

EXHAUST EMISSION CONTROL CATALYST

TECHNICAL FIELD

The present invention relates to a catalyst for purifying an exhaust gas, catalyst which is used in an exhaust system of an automobile to purify harmful components in the exhaust gas, more particularly to an HC-adsorption type NOx-selective-reduction type catalyst that can selectively reduce and remove NOx in an oxygen-rich exhaust gas, which is emitted from a diesel engine, or the like, by HC adsorbed on a zeolite support.

BACKGROUND ART

As an NOx-selective-reduction type catalyst that selectively reduces NOx and purifies them, a catalyst for purifying a diesel exhaust gas has been known which is made by loading a catalyst metal on a zeolite. Since the zeolite has many acidic sites so that it is acidic, it is good in terms of the HC adsorbing capability and adsorbs HC in the exhaust gas. Therefore, even in an oxygen-rich exhaust gas, such as the diesel exhaust gas, the atmosphere becomes a stoichiometric or a rich atmosphere, in which HC are abundant, adjacent to the catalyst, and NOx react with the adsorbed HC and are thereby reduced and purified by the catalytic action of the loaded catalyst metal.

Further, the zeolite exhibits a cracking action, and zeolites, such as mordenite, ZSM-5, an ultra-stable and type "Y" zeolite (US-Y), exhibit an especially high cracking action. Therefore, by using these zeolites as a catalyst support, the SOF (Soluble Organic Fraction) in the diesel exhaust gas are subjected to cracking, and become low-molecular HC, which are more likely to react, and thus the NOx can be reduced and purified more efficiently.

Furthermore, by injecting HC, such as a light oil and propane, into the diesel exhaust gas, the exhaust gas atmosphere is turned into a stoichiometric or a rich atmosphere, and thereby the NOx purifying capability is enhanced. In this case as well, by using a zeolite support, the atmosphere adjacent to the catalyst becomes a rich atmosphere in which HC are more abundant, and accordingly the NOx purifying capability is further improved.

In HC-adsorption type catalysts in which a zeolite is used as a support, improving the HC adsorbing capability would result in improving the NOx purifying capability. However, according to recent studies, it has been revealed that upgrading the HC adsorption capability does not necessarily result in improving the NOx purifying capability.

One of the causes for this is that the so-called HC poisoning of the catalyst metal occurs when the adsorbed HC are desorbed to adsorb onto the catalyst metal, such as Pt, or the like, and the activity of the catalyst metal decreases.

Further, the zeolite is a tectaluminosilicate chemically, and zeolites having a variety of Si/Al ratios have been known. And it has been understood that the characteristics of zeolites depend greatly on the values of this Si/Al ratio.

Since a zeolite having a small Si/Al ratio has many acidic sites and exhibits a high cracking capability and a high HC adsorption capability, a catalyst made by loading a catalyst metal on this is good in terms of the NOx purifying capability. However, in the zeolite having many acidic sites, the HC adsorbed in the pores are carbonized to cause the caulking easily, and they close the insides of the pores, and as a result, there is a drawback in that the HC adsorbing capability decreases chronologically.

Further, a zeolite having many acidic sites loses the acidic sites easily by de-Al (The 4-coordination is turned into the 6-coordination in the zeolite structure.) when it is subjected to a hydrothermal durability test, there arises a drawback in that the cracking capability decreases. Furthermore, in the catalyst in which a catalyst metal is loaded on such a zeolite, by the de-Al resulting from the hydrothermal durability test, the catalyst metal grows granularly so that the activity decreases considerably and there arises a drawback in that the durability is low.

Whilst, a zeolite having a large Si/Al ratio has advantages in that, since it is less likely to be subjected to the de-Al and since the granular growth of the catalyst metal resulting from the de-Al is suppressed, it is good in terms of the durability. However, in the zeolite having a large Si/Al ratio, since the acidic sites exist less, the adsorbing capability and the cracking capability are low so that there is a problem in that the NOx purifying capability is low initially.

By the way, sulfur oxides (SOx), which result from the combustion of the sulfur components in the fuel, are contained in the exhaust gas, and there arises a drawback in that the catalytic activity of the catalyst metal decreases when these SOx components adsorb onto the catalyst metal (especially, Pt). This is referred to as the SOx poisoning.

As a method for inhibiting the SOx poisoning, it is possible to think of a method in which an alkaline component, such as an alkali metal and an alkaline-earth metal, is loaded together with the catalyst metal. Namely, since SOx is more likely to adsorb onto the alkaline component than onto the catalyst metal, such as Pt, the SOx poisoning of the catalyst metal is suppressed, and the high catalytic activity is maintained.

However, when the alkaline component is loaded, the SOx poisoning of the catalyst metal is suppressed, but the alkaline component is loaded onto the acidic sites of a zeolite preferentially. Therefore, the neutralization results in the disappearance of the acidic sites, and there arises a drawback in that the major characteristics of a zeolite, i.e., the HC adsorbing capability and the cracking capability, decrease.

The present invention has been developed in view of these situations, and it is a major object of the present invention to make an HC-adsorption type exhaust-gas-purifying catalyst which exhibits a high NOx purifying capability initially and which can maintain the high conversion after a durability test.

Further, it is a secondary object of the present invention to further improve the NOx purifying capability by suppressing the HC poisoning of the catalyst metal while improving the HC adsorbing capability.

Furthermore, it is a further object of the present invention to suppress the SOx poisoning of the catalyst metal, and also to suppress the decrement of the high HC adsorbing capability and the high cracking capability of a zeolite.

DISCLOSURE OF INVENTION

It is a characteristic of an exhaust-gas-purifying catalyst of embodiments of the invention that it is a catalyst reducing and purifying nitrogen oxides in an oxygen rich atmosphere which contains oxygen more than necessary for oxidizing components to be oxidized in the exhaust gas by hydrocarbon (HC) adsorbed on a zeolite support, wherein:

the zeolite support comprises a first zeolite loaded with at least a catalyst metal selected from the group consisting of Pt, Rh, Pd, Ir and Ag and at least an alkali component selected from the group consisting of alkali metals and alkaline-earth metals and a second zeolite free from loading a catalyst metal and an alkali component, and both the first zeolite and the second zeolite are mixed in a powdered state.

In further embodiments, in the exhaust-gas-purifying catalyst, the first zeolite has pores whose diameters are a predetermined value or less and the second zeolite has pores whose diameters exceed the predetermined value.

In further embodiments, in the exhaust-gas-purifying catalyst, the predetermined value is 5.5 Å.

In further embodiments, in the exhaust-gas-purifying catalyst, the first zeolite is ¼–½ by weight ratio in all zeolites.

In further embodiments, in the exhaust-gas-purifying catalyst, a molar ratio of silicon with respect to aluminum (Si/Al) is larger in the first zeolite than in the second zeolite.

In further embodiments, the exhaust-gas-purifying catalyst is reducing and purifying nitrogen oxides in an oxygen rich atmosphere which contains oxygen more than necessary for oxidizing components to be oxidized in the exhaust gas by hydrocarbon (HC) adsorbed on a zeolite support, wherein: the zeolite support comprises a first zeolite loaded with at least a catalyst metal selected from the group consisting of Pt, Rh, Pd, Ir and Ag and a second zeolite free from loading a catalyst metal, a molar ratio (Si/Al) of silicon with respect to aluminum of the first zeolite is greater than that of the second zeolite by 150 or more, and both the first zeolite and the second zeolite are mixed in a powdered state.

In further embodiments, in the exhaust-gas-purifying catalyst, the first zeolite is ⅔–½ by weight ratio in all zeolites.

In further embodiments, in the exhaust-gas-purifying catalyst, the first zeolite employs mordenite exhibiting 200 or more, ZSM-5 exhibiting 1,000 or more, type "Y" zeolite exhibiting 400 or more, type "A" zeolite exhibiting 400 or more, ferrierite exhibiting 400 or more, or zeolite β exhibiting 200 or more by a molar ratio (Si/Al).

In further embodiments, in the exhaust-gas-purifying catalyst, the first zeolite has pores whose diameters are a predetermined value or less, and the second zeolite has pores whose diameters exceed the predetermined value. And, in further embodiments, in the exhaust-gas-purifying catalyst, the predetermined value is 5.5 Å.

BEST MODE FOR CARRYING OUT THE INVENTION

Figure 1:
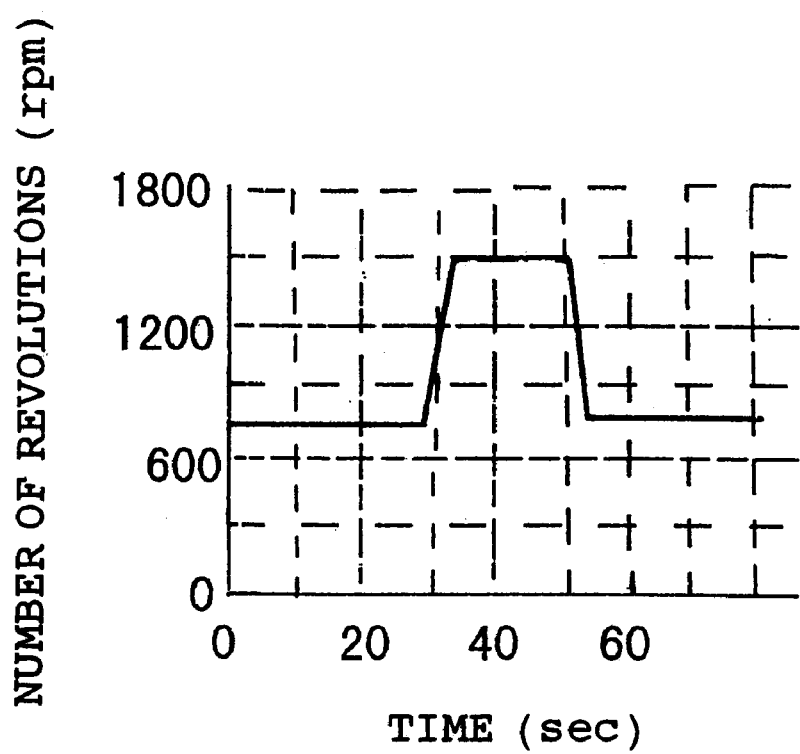
FIG. 1 is a graph for illustrating a load variation of a diesel engine which was used in evaluations on examples.

In the exhaust-gas-purifying catalyst of the present invention, the zeolite support is constituted by the first zeolite, on which the catalyst metal is loaded, and the second zeolite, which is free from the loading of the catalyst metal. On the first zeolite which is loaded with the catalyst metal, HC are oxidized by the catalyst metal, and adsorbed HC are considerably less. Therefore, in the exhaust-gas-purifying catalyst according to the present invention, HC in the exhaust gas are mainly adsorbed onto the second zeolite.

On the other hand, on the first zeolite, NO is oxidized by the catalyst metal, and is turned into NOx. There are released HC, which are adsorbed on the second zeolite, and accordingly the HC concentration adjacent to the first zeolite is heightened, NOx are efficiently reduced and purified to N2 by the reaction of NOx and HC. Further, since the SOF in the exhaust gas are cracked by the second zeolite to HC which have low molecular weights, and which are highly reactive, the aforementioned operations are effected further actively.

By these operations, the exhaust-gas-purifying catalyst of the present invention exhibits high NOx purifying performance.

As for the first zeolite and the second zeolite in the exhaust-gas-purifying catalyst of the present invention, it is possible to use a natural or synthesized zeolite, such as mordenite, ZSM-5, type "Y" zeolite, type "A" zeolite, ferrierite, zeolite β. It is possible to use a single species which is selected from these, and it is also possible to mix and use a plurality of the species. Further, the materials of the first zeolite and the second zeolite can be different, and an identical zeolite can be used.

A ratio between the first zeolite and the second zeolite can preferably fall in the range of ¼–½ by weight of the first zeolite with respect to total zeolites. When the first zeolite is more than ½, there arises a drawback in that the HC adsorption capability cannot be secured sufficiently. Further, when the first zeolite is ¼ or less with respect to the total zeolites, there arises a case where the dispersibilty of the noble metal decreases.

As for the noble metal, it is possible to use a noble metal, such as platinum (Pt), rhodium (Rh), palladium (Pd), iridium (Ir) and silver (Ag). Further, depending on cases, it is possible to use a base metal, such as iron, cobalt and nickel. It is possible to combinedly use the noble metal and the base metal.

A loading amount of the catalyst metal depends on the specific metals, however, for example, when it is platinum, it is possible to load on the first zeolite in an amount of 1–3 g with respect to 1 liter of a honeycomb catalyst support.

When producing the exhaust-gas-purifying catalyst according to the present invention, the first zeolite powder, which is loaded with a catalyst metal, and the second zeolite powder, which is free from the loading can be mixed to make a mixture powder, and the mixture powder can be pelletized to make a pellet catalyst. Alternatively, this mixture powder can be coated on a honeycomb support substrate to make a honeycomb catalyst.

By the way, it has been revealed that the HC poisoning of the catalyst metal is likely to arise in higher HC species which have a relatively large number of carbon atoms. Accordingly, it is possible to suppress the HC poisoning by inhibiting the higher HC species from contacting with the catalyst metal.

Whilst, by the studies of the present inventors, it has been found that there is a correlation between a pore diameter of a zeolite and the number of carbon atoms of HC (molecular weights) to be adsorbed in the pores. Namely, in pores of a small diameter, lower HC are mainly adsorbed which have small number of carbon atoms and which are less bulky molecularly, and in pores of a large diameter, higher HC are mainly adsorbed which have large number of carbon atoms and which are more bulky molecularly.

Hence, according to the exhaust-gas-purifying catalyst of the present invention, it is preferably arranged so that the first zeolite has pores whose diameters are a predetermined value or less, and that the second zeolite has pores whose diameters exceed the predetermined value.

With this arrangement, since the higher HC, which have a large number of carbon atoms and which are bulky molecularly, are adsorbed mainly onto the second zeolite whose pore diameters exceed the predetermined value, they contact with the catalyst metal with a lower probability, and the HC poisoning of the catalyst metal is suppressed.

Whilst, the lower HC, which have small number of carbon atoms and which are less bulky molecularly, are adsorbed mainly onto the first zeolite whose pore diameters are a predetermined value or less, react with NOx by the catalytic action of the catalyst metal loaded therein, and reduce and purify the NOx. Note that, since the lower HC, which have small number of carbon atoms and which are less bulky molecularly, are highly active and are likely to be oxidized independently, they are not expected to react with NOx when they are adsorbed away from the catalyst metal. However, in the catalyst described above, since the catalyst metal is loaded on the first zeolite which has the pores of a predetermined value or less, the lower HC, which have small number of carbon atoms and which are less bulky molecularly, are adsorbed onto the first zeolite, and since the HC are in proximity to the catalyst metal sufficiently, the adsorbed HC react with the NOx by the catalytic action of the catalyst metal so that the NOx are efficiently reduced and purified.

Further, the higher HC, which are adsorbed onto the second zeolite whose pore diameter exceeds the predetermined value, which have a large number of carbon atoms and which are bulky molecularly, are subjected to cracking by the zeolite, the number of carbon atoms decreases, and become less bulky molecularly. Accordingly, the HC subjected to the cracking are easily desorbed from the pores of the second zeolite, are adsorbed onto the first zeolite, and react with the NOx by the catalytic action of the catalyst metal so that the NOx are reduced and purified.

As for the specific value of the aforementioned predetermined value, it is possible to employ it in a trial-and-error manner dependently on the types of the catalyst metal and the temperatures of the exhaust gas. However, as for the HC species which cause the HC poisoning to the catalyst metal, HC having a side chain, aromatic cyclic HC, etc., are listed. The molecular diameters of these HC species exceed 5.5 Å mostly. Further, HC species, which do not cause the HC poisoning to the catalyst metal, are linear HC, such as propane, butane, etc., and the molecular diameters of these HC species 5 Å or less mostly. Hence, it is preferred that, as for the first zeolite, a zeolite whose pore diameter is 5.5 Å or less is used, and that, as for the second zeolite, a zeolite whose pore diameter exceeds 5.5 Å is used.

For example, since the average pore diameter of ferrierite is 4.8 Å, the average pore diameter of ZSM-5 is 5.5 Å, the average pore diameter of mordenite is 7 Å, the average pore diameter of US-Y (type "Y") zeolite is 7.8 Å and the average pore diameter of zeolite β is 8.0 Å, it is preferred that, as for the first zeolite, ferrierite, ZSM-5, etc., are used, and that, as for the second zeolite, mordenite, US-Y, zeolite β, etc., are used.

A plurality of zeolites can be used for the first zeolite and/or the second zeolite. If such is the case, an average value of the pores of the plurality of zeolites can be taken as the pore diameter of the first zeolite and/or the second zeolite.

According to the exhaust-gas-purifying catalyst of the present invention, an alkali component is further loaded on the first zeolite in addition to the catalyst metal. Hence, as described above, the SOx poisoning of the catalyst is suppressed by the alkali component. However, since the alkali component is loaded onto the acidic sites of the first zeolite preferentially, The first zeolite itself is low in terms of the HC adsorbing capability and the cracking capability.

Accordingly, in the exhaust-gas-purifying catalyst of the present invention, the second zeolite is mixed with respect to the first zeolite loaded with the alkali component, and is used. Since no alkali component is loaded onto this second zeolite, a high HC adsorbing capability and a cracking capability are secured by the second zeolite. Namely, the SOF in an exhaust gas are cracked mainly by the second zeolite, and the generated HC and the HC in the exhaust gas are adsorbed mainly onto the second zeolite.

Whilst, the NOx in the exhaust gas are further oxidized partly on the surface of the catalyst metal by oxygen existing in the exhaust gas, but are reduced and purified to N2 on the surface of the catalyst metal by the HC released from the second zeolite.

And, since the SOx poisoning of the catalyst metal is suppressed by the alkali component, the exhaust-gas-purifying catalyst of the present invention is good in terms of the durability, and has a high NOx purifying capability after a durability test.

The alkali component referred herein means an alkali metal and an alkaline-earth metal, as for the alkali metal, lithium, sodium, potassium, rubidium, cesium and francium are listed. Further, the alkaline-earth metal means the group 2A elements in the periodic table of the elements, barium, beryllium, magnesium, calcium and strontium are listed.

The alkali component can preferably be loaded in an amount of 0.01–2 mol with respect to 100 parts by weight of the first zeolite. When the loading amount of the alkali component is less than 0.01 mol, it is difficult to suppress the SOx poisoning of the catalyst metal, when it is loaded in an amount of more than 2 mol, there might arise a case where the NOx purifying capability decreases.

In the exhaust-gas-purifying catalyst of the present invention, the second zeolite can preferably be mixed in an amount of 30–500 parts by weight with respect to 100 parts by weight of the first zeolite. When the mixed amount of the second zeolite is less than 30 parts by weight, the HC adsorbing capability and the cracking capability are decreased so that the NOx purifying capability decreases, when it is more than 500 parts by weight, the content of the first zeolite decreases relatively to decrease the contents of the catalyst metal and the alkali component so that the NOx purifying capability decreases.

Note that it is preferred that nothing is loaded on the second zeolite, however, depending on cases, a part or all of the catalyst metal can be loaded. With this arrangement, the SOx poisoning of the noble metal is likely to occur, but since the reactivity between the released HC and the NOx is improved, the initial NOx purifying capability is improved.

When producing the exhaust-gas-purifying catalyst of the present invention, the catalyst metal and the alkali component are first loaded on the first zeolite by an ordinary method, thereby making a loaded first zeolite. The second zeolite free from loading is mixed with this loaded first zeolite to make a mixture powder, the mixture powder is made into a slurry, and a honeycomb catalyst can be produced by coating and burning the slurry on a honeycomb support substrate.

According to the exhaust-gas-purifying catalyst of the present invention, the first zeolite which has a large molar ratio (Si/Al) is used. In the first zeolite which has a large molar ratio (Si/Al), since there are less acidic sites, the HC adsorbing capability is low. However, since the de-Al hardly occurs, the granular growth of the catalyst metal resulting from the de-Al is suppressed, and the durability is improved. Further, by the de-Al, the chronological decrement of the HC adsorbing ability is inhabited.

Whilst, the second zeolite has a smaller molar ratio (Si/Al) than the first zeolite. Since the zeolite, which has such a smaller molar ratio (Si/Al), has a large number of acidic sites, it is good in terms of the HC adsorbing capability.

And, the catalyst metal is loaded on the first zeolite. Accordingly, since the de-Al hardly occurs, the granular growth of the catalyst metal is suppressed during the service, and since the initial activity is maintained for a long period of time, the present exhaust-gas-purifying catalyst is good in terms of the durability of the NOx purifying capability.

When the difference is a bit between the molar ratios (Si/Al) of the first zeolite and the second zeolite, the effect is obtained to a certain extent, but it is preferred that 200 or more is given to the difference.

In the exhaust-gas-purifying catalyst, it is preferred that the ratio of the first zeolite with respect to the second zeolite falls in the range of the first zeolite/the second zeolite=$\frac{2}{3}$–$\frac{1}{2}$ by weight. When the first zeolite is smaller than this range, since the catalyst metal is loaded on the first zeolite with a high density, the granular growth is likely to occur unpreferably. Further, when the second zeolite is smaller than this range, the HC adsorbing capability decreases so that NOx purifying capability decreases unpreferably.

As for the first zeolite and the second zeolite, it is possible to use an independent species selected from a plurality of zeolites, and a plurality of them can be mixed to use. In the latter case, they are selected and used so that the average value of the molar ratio (Si/Al) is larger in the first zeolite than in the second zeolite.

However, in view of the structural stability, it is preferable for the first zeolite to use mordenite exhibiting 200 or more, ZSM-5 exhibiting 1,000 or more, type "Y" zeolite exhibiting 400 or more, type "A" zeolite exhibiting 400 or more, ferrierite exhibiting 400 or more, or zeolite β exhibiting 200 or more by a molar ratio (Si/Al). The molar ratio (Si/Al) of the first zeolite is smaller than these values, the granular growth of the catalyst metal is likely to occur by the changes of the zeolite structures during the service, and the durability of the NOx purifying ability decreases.

PREFERRED EMBODIMENTS

Hereinafter, the present invention will be described in detail with reference to examples and comparative examples. Note that, unless otherwise specified, the word "parts" shall hereinafter mean parts by weight.

Reference Example No. 1

100 parts of a commercially available ZSM-5 powder (ZSM5-40: "HSZ840HOA" made by Tohso Co., Ltd., Si/Al ratio=40, an average pore diameter 5.5 Å) was prepared, was mixed with 100 parts of a hexaammine platinum hydroxide salt aqueous solution having a concentration of 3% by weight and 200 parts of pure water, and was stirred for 1 hour. Thereafter, the mixture was kept to be heated at 100° C. to evaporate and dry, was dried at 120° C. for 2 hours, and was burned at 300° C. for 2 hours, thereby preparing a first zeolite powder loaded with Pt in an amount of 3.0% by weight.

Whilst, an unloaded mordenite powder (Mor30: "HSZ660HOA" made by Tohso Co., Ltd., Si/Al ratio=30, an average pore diameter 7.0 Å) was taken as a second zeolite powder.

Next, 50 parts of the first zeolite powder with Pt loaded, 100 parts of the aforementioned second zeolite, 180 parts of pure water, and 55 parts of a silica sol (solid content 35%) were mixed, and were stirred, thereby preparing a slurry.

Then, a honeycomb support substrate (volume 1.5 L) made from cordierite was prepared, was immersed into the slurry, was thereafter taken up therefrom, and was blown to remove the excessive slurry, was dried at 100° C. for 2 hours, and was thereafter burned at 500° C. for 2 hours, thereby obtaining a catalyst of Reference Example No. 1. The coating amount was 150 g with respect to 1 L of the support substrate, and the loading amount of Pt was 1.0 g with respect to 1 L of the support substrate.

Reference Example 2

Except that 100 parts of a mordenite powder (Mor203: "HSZ690HOA" made by Tohso Co., Ltd., Si/Al ratio=203, an average pore diameter 7.0 Å) was used as the second zeolite powder instead of Mor30, a catalyst of Example No. 2 was prepared in the same manner as Reference Example No. 1. The coating amount was 150 g with respect to 1 L of the support substrate, and the loading amount of Pt was 1.0 g with respect to 1 L of the support substrate.

Reference Example 3

Except that 100 parts of a type "Y" zeolite powder (USY-30: "HSZ370HUA" made by Tohso Co., Ltd., Si/Al ratio=30, an average pore diameter 7.8 Å) was used as the second zeolite powder instead of Mor30, a catalyst of Reference Example No. 3 was prepared in the same manner as Reference Example No. 1. The coating amount was 150 g with respect to 1 L of the support substrate, and the loading amount of Pt was 1.0 g with respect to 1 L of the support substrate.

Reference Example 4

Except that 100 parts of a type "Y" zeolite powder (USY-400: "HSZ390HUA" made by Tohso Co., Ltd., Si/Al ratio=400, an average pore diameter 7.8 Å) was used as the second zeolite powder instead of Mor30, a catalyst of Reference Example No. 4 was prepared in the same manner as Reference Example No. 1. The coating amount was 150 g with respect to 1 L of the support substrate, and the loading amount of Pt was 1.0 g with respect to 1 L of the support substrate.

Reference Example 5

Except that 100 parts of a ZSM-5 powder (ZSM5-2000: "HSZ890HOA" made by Tohso Co., Ltd., Si/Al ratio=2000, an average pore diameter 5.5 Å) was used as the first zeolite powder, a first zeolite powder loaded with Pt was prepared in the same manner as Reference Example No. 1.

And, the first zeolite powder loaded with Pt and the second zeolite powder same as that of Reference Example No. 1 were used, and were coated in the same manner as Reference Example No. 1, thereby preparing a catalyst of Example No. 1. The coating amount was 150 g with respect to 1 L of the support substrate, and the loading amount of Pt was 1.0 g with respect to 1 L of the support substrate.

Example No. 2

Except that 100 parts of a ZSM-5 powder (ZSM5-2000: "HSZ890HOA" made by Tohso Co., Ltd., Si/Al ratio=2000, an average pore diameter 5.5 Å) was used as the first zeolite powder, a first zeolite powder loaded with Pt was prepared in the same manner as that of Reference Example No. 1.

Whilst, an unloaded mordenite powder (Mor203: "HSZ690HOA" made by Tohso Co., Ltd., Si/Al ratio=203, an average pore diameter 7.0 Å) was made into a second zeolite powder.

And, they were coated in the same manner as Reference Example No. 1, thereby preparing a catalyst of Example No. 2. The coating amount was 150 g with respect to 1 L of the support substrate, and the loading amount of Pt was 1.0 g with respect to 1 L of the support substrate.

Reference Example 5

Except that 100 parts of a mordenite powder (Mor30: "HSZ660HOA" made by Tohso Co., Ltd., Si/Al ratio=30, an average pore diameter 7.0 Å) was used as the first zeolite powder, a first zeolite powder loaded with Pt was prepared in the same manner as Reference Example No. 1.

Whilst, an unloaded type "Y" zeolite powder (USY-30: "HSZ370HUA" made by Tohso Co., Ltd., Si/Al ratio=30, an average pore diameter 7.8 Å) was made into a second zeolite powder.

And, they were coated in the same manner as Reference Example No. 1, thereby preparing a catalyst of Reference Example No. 7. The coating amount was 150 g with respect to 1 L of the support substrate, and the loading amount of Pt was 1.0 g with respect to 1 L of the support substrate.

Example No. 3

Except that 100 parts of a mordenite powder (Mor203: "HSZ690HOA" made by Tohso Co., Ltd., Si/Al ratio=203, an average pore diameter 7.0 Å) was used as the first zeolite powder, a first zeolite powder loaded with Pt was prepared in the same manner as Reference Example No. 1.

Whilst, an unloaded type "Y" zeolite powder (USY30: "HSZ370HUA" made by Tohso Co., Ltd., Si/Al ratio=30, an average pore diameter 7.8 Å) was made into a second zeolite powder.

And, they were coated in the same manner as Reference Example No. 1, thereby preparing a catalyst of Example No. 3. The coating amount was 150 g with respect to 1 L of the support substrate, and the loading amount of Pt was 1.0 g with respect to 1 L of the support substrate.

Reference Example No. 6

Except that 100 parts of a ferrierite powder (Fer17: "HSZ720HOA" made by Tohso Co., Ltd., Si/Al ratio=17, an average pore diameter 4.8 Å) was used as the first zeolite powder, a first zeolite powder loaded with Pt was prepared in the same manner as Reference Example No. 1.

Whilst, an unloaded ZSM-5 powder (ZSM5-40: "HSZ840HOA" made by Tohso Co., Ltd., Si/Al ratio=40, an average pore diameter 5.5 Å) was made into a second zeolite powder.

And, they were coated in the same manner as Reference Example No. 1, thereby preparing a catalyst of Reference Example No. 6. The coating amount was 150 g with respect to 1 L of the support substrate, and the loading amount of Pt was 1.0 g with respect to 1 L of the support substrate.

Reference Example No. 7

Except that 100 parts of a ferrierite powder (Fer17: "HSZ720HOA" made by Tohso Co., Ltd., Si/Al ratio=17, an average pore diameter 4.8 Å) was used as the first zeolite powder, a first zeolite powder loaded with Pt was prepared in the same manner as Reference Example No. 1.

Whilst, an unloaded ZSM-5 powder (ZSM5-2000: "HSZ890HOA" made by Tohso Co., Ltd., Si/Al ratio=2000, an average pore diameter 5.5 Å) was made into a second zeolite powder.

And, they were coated in the same manner as Reference Example No. 1, thereby preparing a catalyst of Reference Example No. 7. The coating amount was 150 g with respect to 1 L of the support substrate, and the loading amount of Pt was 1.0 g with respect to 1 L of the support substrate.

Reference Example No. 8

Except that 100 parts of a ferrierite powder (Fer17: "HSZ720HOA" made by Tohso Co., Ltd., Si/Al ratio=17, an average pore diameter 4.8 Å) was used as the first zeolite powder, a first zeolite powder loaded with Pt was prepared in the same manner as Reference Example No. 1.

Whilst, an unloaded mordenite powder (Mor30: "HSZ660HOA" made by Tohso Co., Ltd., Si/Al ratio=30, an average pore diameter 7.0 Å) was made into a second zeolite powder.

And, they were coated in the same manner as Reference Example No. 1, thereby preparing a catalyst of Reference Example No. 8. The coating amount was 150 g with respect to 1 L of the support substrate, and the loading amount of Pt was 1.0 g with respect to 1 L of the support substrate.

Reference Example No. 9

Except that 100 parts of a ferrierite powder (Fer17: "HSZ720HOA" made by Tohso Co., Ltd., Si/Al ratio=17, an average pore diameter 4.8 Å) was used as the first zeolite powder, a first zeolite powder loaded with Pt was prepared in the same manner as Reference Example No. 1.

Whilst, an unloaded mordenite powder (Mor203: "HSZ690HOA" made by Tohso Co., Ltd., Si/Al ratio=203, an average pore diameter 7.0 Å) was made into a second zeolite powder.

And, they were coated in the same manner as Reference Example No. 1, thereby preparing a catalyst of Reference Example No. 9. The coating amount was 150 g with respect to 1 L of the support substrate, and the loading amount of Pt was 1.0 g with respect to 1 L of the support substrate.

Reference Example No. 10

Except that 100 parts of a ferrierite powder (Fer17: "HSZ720HOA" made by Tohso Co., Ltd., Si/Al ratio=17, an average pore diameter 4.8 Å) was used as the first zeolite powder, a first zeolite powder loaded with Pt was prepared in the same manner as Reference Example No. 1.

Whilst, an unloaded type "Y" zeolite powder (USY30: "HSZ370HOA" made by Tohso Co., Ltd., Si/Al ratio=30, an average pore diameter 7.8 Å) was made into a second zeolite powder.

And, they were coated in the same manner as Reference Example No. 1, thereby preparing a catalyst of Reference Example No. 10. The coating amount was 150 g with respect to 1 L of the support substrate, and the loading amount of Pt was 1.0 g with respect to 1 L of the support substrate.

Reference Example No. 11

Except that 100 parts of a ZSM-5 powder (ZSM5-40: "HSZ840HOA" made by Tohso Co., Ltd., Si/Al ratio=40, an average pore diameter 5.5 Å) was used as the first zeolite powder, a first zeolite powder loaded with Pt was prepared in the same manner as Reference Example No. 1.

Whilst, an unloaded mordenite powder (Mor30: "HSZ660HOA" made by Tohso Co., Ltd., Si/Al ratio=30, an average pore diameter 7.0 Å) was made into a second zeolite powder.

Next, 75 parts of the first zeolite powder with Pt loaded, 75 parts of the aforementioned second zeolite, 180 parts of pure water, and 55 parts of a silica sol (solid content 35%) were mixed, and were stirred, thereby preparing a slurry.

Then, a honeycomb support substrate (volume 1.5 L) made from cordierite was prepared, was immersed into the slurry, was thereafter taken up therefrom, and was blown to remove the excessive slurry, was dried at 100° C. for 2 hours, and was thereafter burned at 500° C. or 2 hours, thereby obtaining a catalyst of Reference Example No. 11. The coating amount was 150 g with respect to 1 L of the support substrate, and the loading amount of Pt was 1.0 g with respect to 1 L of the support substrate.

Namely, except that the mixing ratio of the first zeolite powder and the second zeolite powder differed, a catalyst of this reference example had the identical arrangement as that of the catalyst of Reference Example No. 1.

Reference Example No. 12

Except that 100 parts of a ZSM-5 powder (ZSM5-40: "HSZ840HOA" made by Tohso Co., Ltd., Si/Al ratio=40, an average pore diameter 5.5 Å) was used as the first zeolite powder, a first zeolite powder loaded with Pt was prepared in the same manner as Reference Example No. 1.

Whilst, an unloaded mordenite powder (Mor30: "HSZ660HOA" made by Tohso Co., Ltd., Si/Al ratio=30, an average pore diameter 7.0 Å) was made into a second zeolite powder.

Next, 100 parts of the first zeolite powder with Pt loaded, 50 parts of the aforementioned second zeolite, 180 parts of pure water, and 55 parts of a silica sol (solid content 35%) were mixed, and were stirred, thereby preparing a slurry.

Then, a honeycomb support substrate (volume 1.5 L) made from cordierite was prepared was immersed into the slurry, was thereafter taken up therefrom, and was blown to remove the excessive slurry, was dried at 100° C. for 2 hours, and was thereafter burned at 500° C. for 2 hours, thereby obtaining a catalyst of Reference Example No. 12. The coating amount was 150 g with respect to 1 L of the support substrate, and the loading amount of Pt was 1.0 g with respect to 1 L of the support substrate.

Namely, except that the mixing ratio of the first zeolite powder and the second zeolite powder differed, a catalyst of this reference example had the identical arrangement as those of the catalysts of Reference Example No. 1 and Reference Example No. 11.

Reference Example No. 13

100 parts of a commercially available type "Y" zeolite powder (USY30: "HSZ370HUA" made by Tohso Co., Ltd., Si/Al ratio=30, an average pore diameter 7.8 Å) was prepared, was mixed with 100 parts of a hexaammine platinum hydroxide salt aqueous solution having a concentration of 3% by weight and 200 parts of pure water, and was stirred for 1 hour. Thereafter, the mixture was kept to be heated at 100° C. to evaporate and dry, was dried at 120° C. for 2 hours, and was burned at 300° C. for 2 hours, thereby preparing a zeolite powder loaded with Pt in an amount of 3.0% by weight.

Next, 50 parts of the zeolite powder with Pt loaded, 100 parts of an unloaded ZSM-5 powder (ZSM5-40: "HSZ840HOA" made by Tohso Co., Ltd., Si/Al ratio=40, an average pore diameter 5.5 Å), 180 parts of pure water, and 55 parts of a silica sol (solid content 35%) were mixed, and were stirred, thereby preparing a slurry.

Then, a honeycomb support substrate (volume 1.5 L) made from cordierite was prepared, was immersed into the slurry, was thereafter taken up therefrom, and was blown to remove the excessive slurry, was dried at 10° C. for 2 hours, and was thereafter burned at 500° C. for 2 hours, thereby obtaining a catalyst of Reference Example No. 13. The coating amount was 150 g with respect to 1 L of the support substrate, and the loading amount of Pt was 1.0 g with respect to 1 L of the support substrate.

Comparative Example No. 1

100 parts of a commercially available γ-alumina powder was prepared, was mixed with 100 parts of a hexaammine platinum hydroxide salt aqueous solution having a concentration of 3% by weight and 200 parts of pure water, and was stirred for 1 hour. Thereafter, the mixture was kept to be heated at 100° C. to evaporate and dry, was dried at 120° C. for 2 hours, and was burned at 300° C. for 2 hours, thereby preparing an alumina powder loaded with Pt in an amount of 3.0% by weight.

Next, 50 parts of the alumina powder with Pt loaded, 100 parts of an unloaded mordenite powder (Mor30: "HSZ660HOA" made by Tohso Co., Ltd., Si/Al ratio=30, an average pore diameter 7.0 Å), 180 parts of pure water, and 55 parts of a silica sol (solid content 35%) were mixed, and were stirred, thereby preparing a slurry.

Then, a honeycomb support substrate (volume 1.5 L) made from cordierite was prepared, was immersed into the slurry, was thereafter taken up therefrom, and was blown to remove the excessive slurry, was dried at 100° C. for 2 hours, and was thereafter burned at 500° C. for 2 hours, thereby obtaining a catalyst of Comparative Example No. 1. The coating amount was 150 g with respect to 1 L of the support substrate, and the loading amount of Pt was 1.0 g with respect to 1 L of the support substrate.

Comparative Example No. 2

100 parts of a commercially available titania powder was prepared, was mixed with 100 parts of a hexaammine platinum hydroxide salt aqueous solution having a concentration of 3% by weight and 200 parts of pure water, and was stirred for 1 hour. Thereafter, the mixture was kept to be heated at 100° C. to evaporate and dry, was dried at 120° C. for 2 hours, and was burned at 300° C. for 2 hours, thereby preparing a titania powder loaded with Pt in an amount of 3.0% by weight.

Next, 50 parts of the titania powder with Pt loaded, 100 parts of an unloaded mordenite powder (Mor30: "HSZ660HOA" made by Tohso Co., Ltd., Si/Al ratio=30, an average pore diameter 7.0 Å), 180 parts of pure water, and 55 parts of a silica sol (solid content 35%) were mixed, and were stirred, thereby preparing a slurry.

Then, a honeycomb support substrate (volume 1.5 L) made from cordierite was prepared, was immersed into the slurry, was thereafter taken up therefrom, and was blown to remove the excessive slurry, was dried at 100° C. for 2 hours, and was thereafter burned at 500° C. for 2 hours, thereby obtaining a catalyst of Comparative Example No. 2. The coating amount was 150 g with respect to 1 L of the support substrate, and the loading amount of Pt was 1.0 g with respect to 1 L of the support substrate.

Comparative Example No. 3

100 parts of a commercially available ZSM-5 powder (ZSM5-40: "HSZ840HOA" made by Tohso Co., Ltd., Si/Al ratio=40, an average pore diameter 5.5 Å) was prepared, was mixed with 100 parts of a hexaammine platinum hydroxide salt aqueous solution having a concentration of 3% by weight and 200 parts of pure water, and was stirred for 1 hour. Thereafter, the mixture was kept to be heated at 100° C. to evaporate and dry, was dried at 120° C. for 2 hours, and was burned at 300° C. for 2 hours, thereby preparing a zeolite powder loaded with Pt in an amount of 3.0% by weight.

Next, 150 parts of the zeolite powder with Pt loaded. 180 parts of pure water, and 55 parts of a silica sol (solid content 35%) were mixed, and were stirred, thereby preparing a slurry.

Then, a honeycomb support substrate (volume 1.5 L) made from cordierite was prepared, was immersed into the slurry, was thereafter taken up therefrom, and was blown to remove the excessive slurry, was dried at 100° C. for 2 hours, and was thereafter burned at 500° C. for 2 hours, thereby obtaining a catalyst of Comparative Example No. 3. The coating amount was 150 g with respect to 1 L of the support substrate, and the loading amount of Pt was 1.0 g with respect to 1 L of the support substrate.

Comparative Example No. 4

100 parts of a commercially available mordenite powder (Mor30: "HSZ660HOA" made by Tohso Co., Ltd., Si/Al ratio=30, an average pore diameter 7.0 Å) was prepared, was mixed with 100 parts of a hexaammine platinum hydroxide salt aqueous solution having a concentration of 3% by weight and 200 parts of pure water, and was stirred for 1 hour. Thereafter, the mixture was kept to be heated at 100° C. to evaporate and dry, was dried at 120° C. for 2 hours, and was burned at 300° C. for 2 hours, thereby preparing a zeolite powder loaded with Pt in an amount of 3.0% by weight.

Next, 150 parts of the zeolite powder with Pt loaded, 180 parts of pure water, and 55 parts of a silica sol (solid content 35%) were mixed, and were stirred, thereby preparing a slurry.

Then, a honeycomb support substrate (volume 1.5 L) made from cordierite was prepared, was immersed into the slurry, was thereafter taken up therefrom, and was blown to remove the excessive slurry, was dried at 100° C. for 2 hours, and was thereafter burned at 500° C. for 2 hours, thereby obtaining a catalyst of Comparative Example No. 4. The coating amount was 150 g with respect to 1 L of the support substrate, and the loading amount of Pt was 1.0 g with respect to 1 L of the support substrate.

Comparative Example No. 5

100 parts of a commercially available type "Y" zeolite powder (USY30: "HSZ370HUA" made by Tohso Co., Ltd., Si/Al ratio=30, an average pore diameter 7.8 Å) was prepared, was mixed with 100 parts of a hexaammine platinum hydroxide salt aqueous solution having a concentration of 3% by weight and 200 parts of pure water, and was stirred for 1 hour. Thereafter, the mixture was kept to be heated at 100° C. to evaporate and dry, was dried at 120° C. for 2 hours, and was burned at 300° C. for 2 hours, thereby preparing a zeolite powder loaded with Pt in an amount of 3.0% by weight.

Next, 150 parts of the zeolite powder with Pt loaded, 180 parts of pure water, and 55 parts of a silica sol (solid content 35%) were mixed, and were stirred, thereby preparing a slurry.

Then, a honeycomb support substrate (volume 1.5 L) made from cordierite was prepared, was immersed into the slurry, was thereafter taken up therefrom, and was blown to remove the excessive slurry, was dried at 100° C. for 2 hours, and was thereafter burned at 500° C. for 2 hours, thereby obtaining a catalyst of Comparative Example No. 5. The coating amount was 150 g with respect to 1 L of the support substrate, and the loading amount of Pt was 1.0 g with respect to 1 L of the support substrate.

Evaluation Test

Each of the aforementioned catalysts was mounted in an exhaust system of a 2,400 c.c. in-line 4-cylinder diesel engine, the number of revolutions was kept constant at 3,600 rpm, the gas temperature was adjusted so that the gas temperature was 600° C. at the inlets of the catalysts by a load, and a durability test was carried out for 25 hours.

After the durability test, each of the catalysts was mounted in an exhaust system of the same engine as that of the durability test, respectively, as illustrated in FIG. 1, the number of revolutions was varied in the range of 750 rpm–1,500 rpm by varying the load, and the maximum HC and NOx conversions were measured, respectively, while adding a light oil into the exhaust gas in the range of 800–1,200 ppmC. The results are set forth in Table 1.

TABLE 1

| | Zeolite Support | | | | Max. Conversion (%) | |
|---|---|---|---|---|---|---|
| | 1st Zeolite | | 2nd Zeolite | | | |
| | Product Name | Pore Dia. Å | Product Name | Pore Dia. Å | $NO_x$ | HC |
| R. #1 | ZSM5-40 | 5.5 | Mor30 | 7.0 | 40 | 86 |
| R. #2 | ZSM5-40 | 5.5 | Mor203 | 7.0 | 38 | 85 |
| R. #3 | ZSM5-40 | 5.5 | USY30 | 7.8 | 36 | 86 |
| R. #4 | ZSM5-40 | 5.5 | USY400 | 7.8 | 35 | 84 |
| E. #1 | ZSM5-2000 | 5.5 | Mor30 | 7.0 | 36 | 83 |
| E. #2 | ZSM5-2000 | 5.5 | Mor203 | 7.0 | 37 | 84 |
| R. #5 | Mor30 | 7.0 | USY30 | 7.8 | 35 | 81 |
| E. #3 | Mor203 | 7.0 | USY30 | 7.8 | 36 | 80 |
| R. #6 | Fer17 | 4.8 | ZSM5-40 | 5.5 | 40 | 87 |
| R. #7 | Fer17 | 4.8 | ZSM5-2000 | 5.5 | 38 | 86 |
| R. #8 | Fer17 | 4.8 | Mor30 | 7.0 | 41 | 88 |
| R. #9 | Fer17 | 4.8 | Mor203 | 7.0 | 37 | 86 |
| R. #10 | Fer17 | 4.8 | USY30 | 7.8 | 36 | 87 |
| R. #11 | ZSM5-40 | 5.5 | Mor30 | 7.0 | 33 | 82 |
| R. #12 | ZSM5-40 | 5.5 | Mor30 | 7.0 | 28 | 76 |
| R. #13 | USY30 | 7.8 | ZSM5-40 | 5.5 | 23 | 72 |
| C.E. #1 | Alumina | — | Mor30 | 7.0 | 22 | 71 |
| C.E. #2 | Titania | — | Mor30 | 7.0 | 21 | 73 |
| C.E. #3 | ZSM5-40 | 5.5 | — | — | 24 | 74 |
| C.E. #4 | Mor30 | 7.0 | — | — | 25 | 75 |
| C.E. #5 | USY30 | 7.8 | — | — | 22 | 70 |

According to Table 1, the reference examples and the examples exhibited remarkably better results than the comparative examples in terms of both of the HC conversion and the NOx conversion. Furthermore, Reference Example No. 3 and Reference Example No. 13 inversely employed the first zeolite and the second zeolite, however, the catalyst of Reference Example No. 3 exhibited markedly high conversions. It is apparent that these results are effected by the arrangement that the average pore diameter of the first zeolite loaded with Pt was smaller than the average pore diameter of the second zeolite.

Moreover, when Reference Example No. 1, Reference Example No. 11 and Reference Example No. 12 were compared, it is understood that the catalyst of Reference Example No. 1 exhibited the highest purifying activity, and that the activities decreased in this order. Namely, it is preferred that the mixing ratio of the first zeolite loaded with Pt and the unloaded second zeolite is small, and, in the range of this reference example, it is most preferred that the first zeolite/the second zeolite =1/2.

Namely, in accordance with the exhaust-gas-purifying catalyst of the present invention, NOx contained in an oxygen rich exhaust gas can be purified efficiently, and since the HC poisoning of the catalyst metal is suppressed, the durability of the NOx purifying performance is extremely good, and it is possible to purify NOx stably for a long period of time.

Example No. 4

Figure 2:
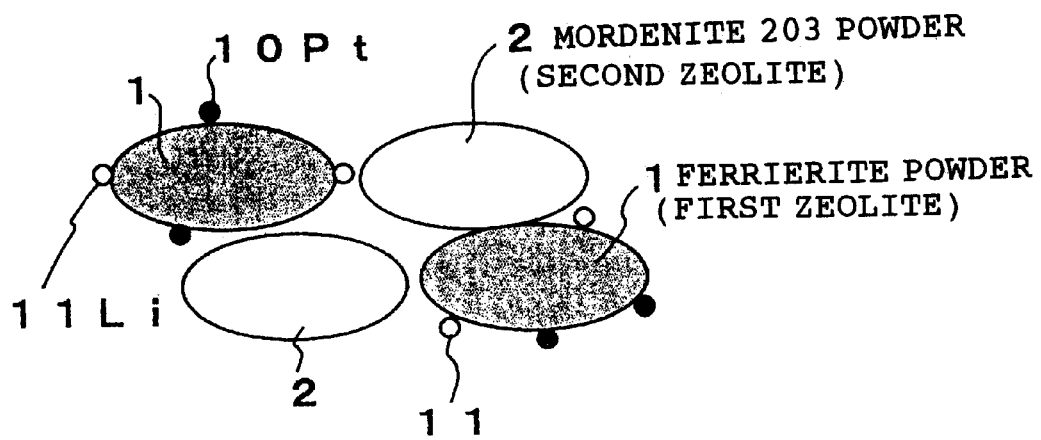
FIG. 2 is an explanatory diagram for schematically illustrating a structure of an exhaust-gas-purifying catalyst of an example according to the present invention.

In FIG. 2, a structure of an exhaust-gas-purifying catalyst according to this example is illustrated schematically. This exhaust-gas-purifying catalyst is constituted by a mixture powder of a ferrierite powder 1, on which Pt 10 and Li 11 are loaded and which works as the first zeolite, and an unloaded mordenite 203 powder 2, which works as the second zeolite. Hereinafter, a production process of this exhaust-gas-purifying catalyst will be described instead of a detailed description of the arrangement.

120 g of a ferrierite powder was mixed with a predetermined amount of a hexaammine platinum hydroxide aqueous solution having a predetermined concentration, and was stirred for 1 hour. Thereafter, the mixture was kept to be heated at 100° C. to evaporate and dry the water content, was dried at 120° C. for 2 hours, and was burned at 300° C. for 2 hours. Thus, 2 g of Pt was loaded on 120 g of the ferrierite.

Next, the ferrierite powder loaded with Pt was mixed with a predetermined amount of a lithium acetate aqueous solution having a predetermined concentration, and was stirred for 1 hour. Thereafter, the mixture was kept to be heated at 100° C. to evaporate and dry the water content, was dried at 120° C. for 2 hours, and was burned at 300° C. for 2 hours. Thus, Li was loaded in an amount of 0.05 mol with respect to 120 g of the ferrierite, and a zeolite support powder was obtained in which 2 g of Pt and 0.05 mol of Li were loaded on 120 g of the ferrierite.

With respect to a total amount of the thus obtained zeolite support powder, 120 g of a mordenite 203 powder was mixed. And, a slurry was prepared from this mixture powder, a honeycomb support substrate (volume 1.5 L) made from cordierite was prepared, immersed into the slurry, was thereafter taken up therefrom, and was blown to remove the excessive slurry, was dried at 100° C. for 2 hours, and was thereafter burned at 500° C. for 2 hours, thereby forming a coating layer, and a monolithic catalyst of Example No. 4 was obtained. The coating amount was about 122 g with respect to 1 L of the support substrate, the loading amount of Pt was 2 g with respect to 1 L of the support substrate, and the loading amount of Li was about 0.05 mol with respect to 1 L of the support substrate.

Example No. 5

Except that a potassium acetate aqueous solution was used instead of the lithium acetate aqueous solution, a monolithic catalyst of Example No. 4 was prepared in the same manner as Example No. 5. The loading amount of K was about 0.05 mol with respect to 1 L of the support substrate.

Example No. 6

Except that a sodium acetate aqueous solution was used instead of the lithium acetate aqueous solution, a monolithic catalyst of Example No. 6 was prepared in the same manner as Example No. 4. The loading amount of Na was about 0.05 mol with respect to 1 L of the support substrate.

Example No. 7

Except that a magnesium acetate aqueous solution was used instead of the lithium acetate aqueous solution, a monolithic catalyst of Example No. 7 was prepared in the same manner as Example No. 4. The loading amount of Mg was about 0.05 mol with respect to 1 L of the support substrate.

Example No. 8

Except that a strontium acetate aqueous solution was used instead of the lithium acetate aqueous solution, a monolithic catalyst of Example No. 8 was prepared in the same manner as Example No. 4. The loading amount of Sr was about 0.05 mol with respect to 1 L of the support substrate.

Example No. 9

Except that a barium acetate aqueous solution was used instead of the lithium acetate aqueous solution, a monolithic catalyst of Example No. 9 was prepared in the same manner as Example No. 4. The loading amount of Ba was about 0.05 mol with respect to 1 L of the support substrate.

Example No. 10

Except that a mixture aqueous solution of potassium acetate and barium acetate was used instead of the lithium acetate aqueous solution, a monolithic catalyst of Example No. 10 was prepared in the same manner as Example No. 4. The loading amounts of K and Ba were about 0.025 mol with respect to 1 L of the support substrate, respectively.

Example No. 11

Except that the lithium acetate aqueous solution was not used, and that Li was not loaded, a monolithic catalyst of Example No. 11 was prepared in the same manner as Example No. 4.

Comparative Example No. 6

Except that the lithium acetate aqueous solution was not used, that Li was not loaded, and that the mordenite 203 powder was not mixed, a monolithic catalyst of Comparative Example No. 6 was prepared in the same manner as Example No. 17.

Example No. 12

Except that a mordenite powder was used instead of the ferrierite powder, a monolithic catalyst of Example No. 12 was prepared in the same manner as Example No. 4.

Example No. 13

Except that a mordenite powder was used instead of the ferrierite powder, and that a potassium acetate aqueous solution was used instead of the lithium acetate aqueous solution, a monolithic catalyst of Example No. 13 was prepared in the same manner as Example No. 4. The loading amount of K was about 0.05 mol with respect to 1 L of the support substrate.

Example No. 14

Except that a mordenite powder was used instead of the ferrierite powder, and that a sodium acetate aqueous solution was used instead of the lithium acetate aqueous solution, a monolithic catalyst of Example No. 14 was prepared in the same manner as Example No. 4. The loading amount of Na was about 0.05 mol with respect to 1 L of the support substrate.

Example No. 15

Except that a mordenite powder was used instead of the ferrierite powder, and that a magnesium acetate aqueous solution was used instead of the lithium acetate aqueous solution, a monolithic catalyst of Example No. 15 was prepared in the same manner as Example No. 4. The loading amount of Mg was about 0.05 mol with respect to 1 L of the support substrate.

Example No. 16

Except that a mordenite powder was used instead of the ferrierite powder, and that a strontium acetate aqueous solution was used instead of the lithium acetate aqueous solution, a monolithic catalyst of Example No. 16 was prepared in the same manner as Example No. 4. The loading amount of Sr was about 0.05 mol with respect to 1 L of the support substrate.

Example No. 17

Except that a mordenite powder was used instead of the ferrierite powder, and that a barium acetate aqueous solution was used instead of the lithium acetate aqueous solution, a monolithic catalyst of Example No. 17 was prepared in the same manner as Example No. 4. The loading amount of Ba was about 0.05 mol with respect to 1 L of the support substrate.

Example No. 18

Except that a mordenite powder was used instead of the ferrierite powder, and that a mixture aqueous solution of potassium acetate and barium acetate was used instead of the lithium acetate aqueous solution, a monolithic catalyst of Example No. 18 was prepared in the same manner as Example No. 4. The loading amounts of K and Ba were about 0.025 mol with respect to 1 L of the support substrate, respectively.

Example No. 19

Except that a mordenite powder was used instead of the ferrierite powder, that the lithium acetate aqueous solution was not used, and that Li was not loaded, a monolithic catalyst of Example No. 19 was prepared in the same manner as Example No. 4.

Comparative Example No. 7

Except that a mordenite powder was used instead of the ferrierite powder, that the lithium acetate aqueous solution was not used, that Li was not loaded, and that the mordenite 203 powder was not mixed, a monolithic catalyst of Comparative Example No. 7 was prepared in the same manner as Example No. 17.

Example No. 20

Except that a ZSM-5 powder was used instead of the ferrierite powder, a monolithic catalyst of Example No. 20 was prepared in the same manner as Example No. 4.

Example No. 21

Except that a ZSM-5 powder was used instead of the ferrierite powder, and that a potassium acetate aqueous solution was used instead of the lithium acetate aqueous solution, a monolithic catalyst of Example No. 21 was prepared in the same manner as Example No. 4. The loading amount of K was about 0.05 mol with respect to 1 L of the support substrate.

Example No. 22

Except that a ZSM-5 powder was used instead of the ferrierite powder, and that a sodium acetate aqueous solution was used instead of the lithium acetate aqueous solution, a monolithic catalyst of Example No. 22 was prepared in the same manner as Example No. 4. The loading amount of Na was about 0.05 mol with respect to 1 L of the support substrate.

Example No. 23

Except that a ZSM-5 powder was used instead of the ferrierite powder, and that a magnesium acetate aqueous solution was used instead of the lithium acetate aqueous solution, a monolithic catalyst of Example No. 23 was prepared in the same manner as Example No. 4. The loading amount of Mg was about 0.05 mol with respect to 1 L of the support substrate.

Example No. 24

Except that a ZSM-5 powder was used instead of the ferrierite powder, and that a strontium acetate aqueous solution was used instead of the lithium acetate aqueous solution, a monolithic catalyst of Example No. 24 was prepared in the same manner as Example No. 4. The loading amount of Sr was about 0.05 mol with respect to 1 L of the support substrate.

Example No. 25

Except that a ZSM-5 powder was used instead of the ferrierite powder, and that a barium acetate aqueous solution was used instead of the lithium acetate aqueous solution, a monolithic catalyst of Example No. 25 was prepared in the same manner as Example No. 4. The loading amount of Ba was about 0.05 mol with respect to 1 L of the support substrate.

Example No. 26

Except that a ZSM-5 powder was used instead of the ferrierite powder, and that a mixture aqueous solution of potassium acetate and barium acetate was used instead of the lithium acetate aqueous solution, a monolithic catalyst of Example No. 26 was prepared in the same manner as Example No. 4. The loading amounts of K and Ba were about 0.025 mol with respect to 1 L of the support substrate, respectively.

Example No. 27

Except that a ZSM-5 powder was used instead of the ferrierite powder, that the lithium acetate aqueous solution was not used, and that Li was not loaded, a monolithic catalyst of Example No. 27 was prepared in the same manner as Example No. 4.

Comparative Example No. 8

Except that a ZSM-5 powder was used instead of the ferrierite powder, that the lithium acetate aqueous solution was not used, that Li was not loaded, and that the mordenite 203 powder was not mixed, a monolithic catalyst of Comparative Example No. 8 was prepared in the same manner as Example No. 4.

Comparative Example No. 9

Except that a ZSM-5 powder was used instead of the ferrierite powder, that a potassium acetate aqueous solution was used instead of the lithium acetate aqueous solution, and that the mordenite 203 powder was not mixed, a monolithic catalyst of Comparative Example No. 9 was prepared in the same manner as Example No. 4. The loading amount of K was about 0.05 mol with respect of 1 L of the support substrate.

Comparative Example No. 10

Except that a ZSM-5 powder was used instead of the ferrierite powder, that a strontium acetate aqueous solution was used instead of the lithium acetate aqueous solution, and that the mordenite 203 powder was not mixed, a monolithic catalyst of Comparative Example No. 10 was prepared in the same manner as Example No. 17. The loading amount of Sr was about 0.05 mol with respect of 1 L of the support substrate.

Evaluation Test

Figure 3:
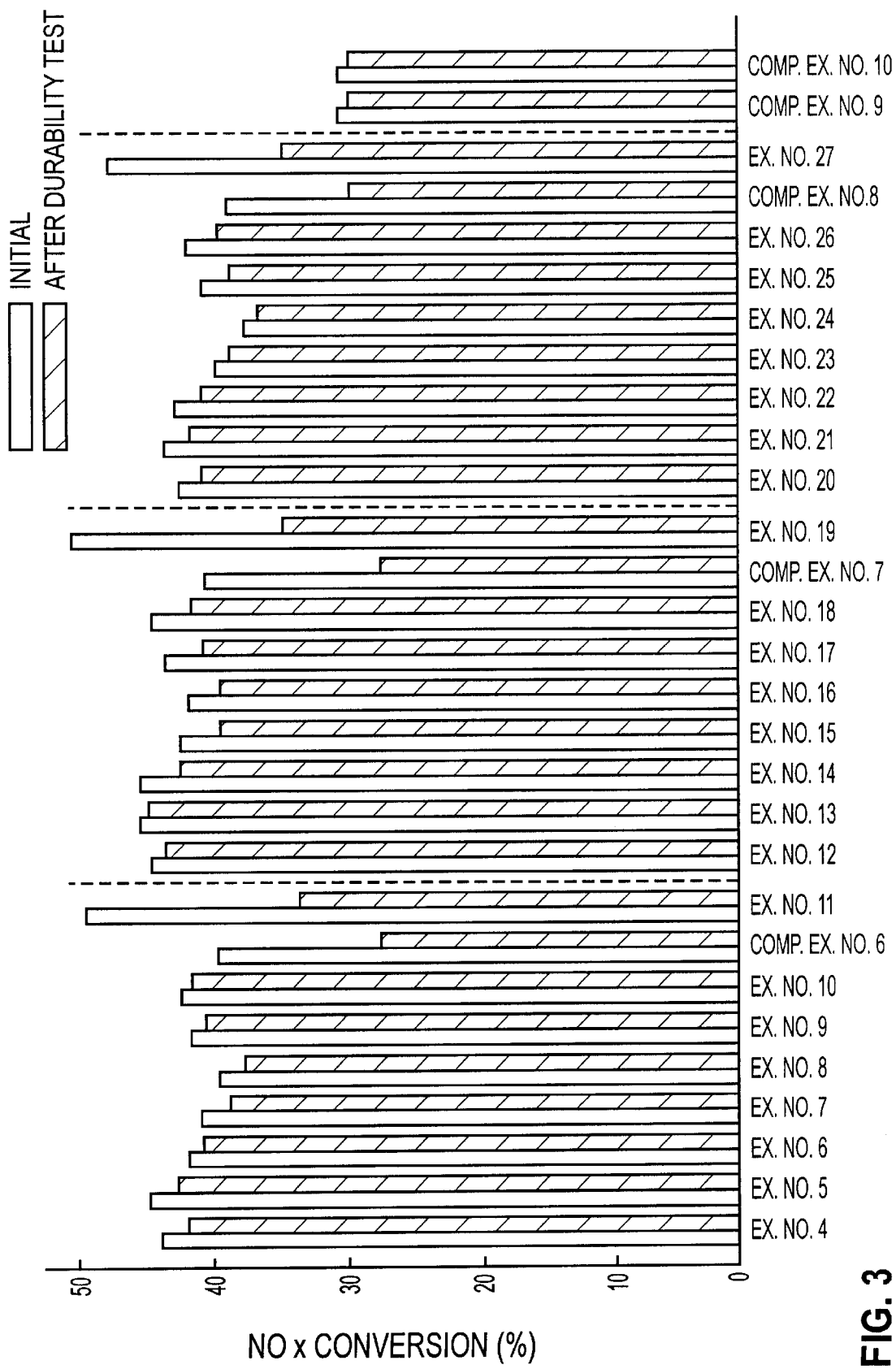
FIG. 3 is a bar graph for illustrating maximum NOx conversions which were exhibited by catalysts of examples and comparative examples initially and after a durability test.

The aforementioned respective catalysts were mounted in an evaluation apparatus, an evaluation model gas set forth in Table 2 was flowed under such a condition that a space velocity (SV) was 200,000/hr in order to measure the NOx conversions, and the respective maximum values were taken as the initial maximum NOx conversions and are set forth in Table 3 and FIG. 3.

Further, with respect to the respective catalysts, a durability test was carried out in which a durability model gas set forth in Table 1 was flowed for 3 hours under such conditions that the space velocity (SV) was 200,000/hr and the inlet gas temperature was 650° C. Thereafter, the NOx conversions were measured similarly as described above, and the respective maximum values were taken as the maximum NOx conversions after the durability test and are set forth in Table 3 and FIG. 3.

TABLE 2

|  | NO (ppm) | CO (ppm) | $CO_2$ (%) | $O_2$ (%) | $C_6H_{14}$ (ppm) | $C_3H_6$ (ppm) | $SO_2$ (ppm) | $N_2$ |
|---|---|---|---|---|---|---|---|---|
| Evaluation Gas | 250 | 150 | 6.7 | 10% | 2000 | — | — | Balance |
| Durability Gas | 250 |  |  |  |  |  |  | Balance |

TABLE 3

| | | Cat. Metal & Alkali Compo. Loading Amounts | | | | | | | | Max. NOx Conversion (%) | |
|---|---|---|---|---|---|---|---|---|---|---|---|
| | First Zeolite | Pt g | Li mol | K mol | Na mol | Mg mol | Sr mol | Ba mol | Mordenite 203 Loading Amount (g) | Initial | After Durability |
| E. No. 4 | Ferri- | 2 | 0.05 | — | — | — | — | — | 120 | 43 | 41 |
| E. No. 5 | erite | 2 | — | 0.05 | — | — | — | — | 120 | 44 | 42 |
| E. No. 6 | | 2 | — | — | 0.05 | — | — | — | 120 | 41 | 40 |
| E. No. 7 | | 2 | — | — | — | 0.05 | — | — | 120 | 40 | 38 |
| E. No. 8 | | 2 | — | — | — | — | 0.05 | — | 120 | 39 | 37 |
| E. No. 9 | | 2 | — | — | — | — | — | 0.05 | 120 | 41 | 40 |
| E. No. 10 | | 2 | — | 0.025 | — | — | — | 0.025 | 120 | 42 | 41 |
| E. No. 11 | | 2 | — | — | — | — | — | — | 120 | 49 | 33 |
| C. E. No. 6 | | 2 | — | — | — | — | — | — | — | 39 | 27 |
| E. No. 12 | Morde- | 2 | 0.05 | — | — | — | — | — | 120 | 44 | 43 |
| E. No. 13 | nite | 2 | — | 0.05 | — | — | — | — | 120 | 45 | 44 |
| E. No. 14 | | 2 | — | — | 0.05 | — | — | — | 120 | 45 | 42 |
| E. No. 15 | | 2 | — | — | — | 0.05 | — | — | 120 | 42 | 39 |
| E. No. 16 | | 2 | — | — | — | — | 0.05 | — | 120 | 41 | 39 |
| E. No. 17 | | 2 | — | — | — | — | — | 0.05 | 120 | 43 | 40 |
| E. No. 18 | | 2 | — | 0.025 | — | — | — | 0.025 | 120 | 44 | 41 |
| E. No. 19 | | 2 | — | — | — | — | — | — | 120 | 50 | 34 |
| C. E. No. 7 | | 2 | — | — | — | — | — | — | — | 40 | 27 |
| E. No. 20 | ZSM-5 | 2 | 0.05 | — | — | — | — | — | 120 | 42 | 40 |
| E. No. 21 | | 2 | — | 0.05 | — | — | — | — | 120 | 43 | 41 |
| E. No. 22 | | 2 | — | — | 0.05 | — | — | — | 120 | 42 | 40 |
| E. No. 23 | | 2 | — | — | — | 0.05 | — | — | 120 | 39 | 38 |
| E. No. 24 | | 2 | — | — | — | — | 0.05 | — | 120 | 37 | 36 |
| E. No. 25 | | 2 | — | — | — | — | — | 0.05 | 120 | 40 | 38 |
| E. No. 26 | | 2 | — | 0.025 | — | — | — | 0.025 | 120 | 41 | 39 |

TABLE 3-continued

| | First Zeolite | Cat. Metal & Alkali Compo. Loading Amounts | | | | | | Mordenite 203 Loading Amount (g) | Max. NOx Conversion (%) | |
| | | Pt g | Li mol | K mol | Na mol | Mg mol | Sr mol | Ba mol | | Initial | After Durability |
|---|---|---|---|---|---|---|---|---|---|---|---|
| E. No. 27 | | 2 | — | — | — | — | — | — | 120 | 47 | 34 |
| C. E. No. 8 | | 2 | — | — | — | — | — | — | — | 38 | 29 |
| C. E. No. 9 | | 2 | — | 0.05 | — | — | — | — | — | 30 | 29 |
| C. E. No. 10 | | 2 | — | — | — | — | 0.05 | — | — | 30 | 29 |

According to Table 3 and FIG. 3, the catalyst of Example No. 11 was superior to the catalyst of Comparative Example No. 6 in terms of the NOx purifying capability, the catalyst of Example No. 19 was superior to the catalyst of Comparative Example No. 7 in terms of the NOx purifying capability, and the catalyst of Example No. 27 was superior to the catalyst of Comparative Example No. 8 in terms of the NOx purifying capability. These results are the effects of the catalyst of the present invention in which the first zeolite loaded with the catalyst metal and the second zeolite free from the loading of the catalyst metal are mixed.

Although the catalysts of Comparative Example Nos. 6, 7 and 8, which were free from the loading of the alkali component, exhibited high initial NO purifying activities, the NOx conversions after the durability test decreased to a large extent by the SOx poisoning. Further, although the catalysts of Comparative Example Nos. 9–10, on which the alkali component was loaded but which do not have the second zeolite, exhibited NOx conversion decrements, which were resulted from the durability test, less, they exhibited the low initial NOx conversions.

It is understood that the other catalysts of the respective examples exhibited high initial NOx conversions, and that they degraded less after the durability test, and this is apparently an effect which results from the loading of the alkali component on the first zeolite and also from mixing the second zeolite.

Namely, in accordance with the exhaust-gas-purifying catalyst of the present invention, since NOx contained in an oxygen rich exhaust gas can be purified efficiently, and since the durability of the NOx purifying performance is extremely good, it is possible to purify NOx stably for a long period of time.

Example No. 28

100 parts of a commercially available mordenite powder (Mor 203: "HSZ690HOA" made by Tohso Co., Ltd., Si/Al ratio=203) was prepared, was mixed with 100 parts of a hexaammine platinum hydroxide salt aqueous solution having a concentration of 3% by weight and 200 parts of pure water, and was stirred for 1 hour. Thereafter, filtering and cleaning were carried out, the mixture was dried at 120° C. for 2 hours, and was burned at 300° C. for 2 hours, thereby preparing a first zeolite powder loaded with Pt in an amount of 3.0% by weight.

Whilst, an unloaded mordenite powder (Mor30: "HSZ660HOA" made by Tohso Co., Ltd., Si/Al ratio=30) was made into a second zeolite powder.

Next, 50 parts of the first zeolite powder with Pt loaded, 100 parts of the aforementioned second zeolite, 180 parts of pure water, and 55 parts of a silica sol (solid content 35%) were mixed, and were stirred, thereby preparing a slurry.

Then, a honeycomb support substrate (volume 1.5 L) made from cordierite was prepared, was immersed into the slurry, was thereafter taken up therefrom, and was blown to remove the excessive slurry, was dried at 100° C. for 2 hours, and was thereafter burned at 500° C. for 2 hours, thereby obtaining a catalyst of Example No. 28. The coating amount was 150 g with respect to 1 L of the support substrate, and the loading amount of Pt was 1.0 g with respect to 1 L of the support substrate.

Example No. 29

Except that, as a second zeolite powder, 100 parts of a mordenite powder (Mor19: "HSZ640HOA" made by Tohso Co., Ltd., Si/Al ratio=19) was used instead of Mor30, a catalyst of Example No. 29 was prepared in the same manner as Example No. 28. The coating amount was 150 g with respect to 1 L of the support substrate, and the loading amount of Pt was 1.0 g with respect to 1 L of the support substrate.

Example No. 30

Except that, as a first zeolite powder, 100 parts of a ZSM-5 powder (ZSM5-2000: "HSZ890HOA" made by Tohso Co., Ltd., Si/Al ratio=2000) was used, a first zeolite powder loaded with Pt was prepared in the same manner as Example No. 28.

Whilst, an unloaded ZSM-5 powder (ZSM5-40: "HSZ840HOA" made by Tohso Co., Ltd., Si/Al ratio=40) was made into a second zeolite powder.

Then, they were coated in the same manner as Example No. 28, thereby preparing a catalyst of Example No. 30. The coating amount was 150 g with respect to 1 L of the support substrate, and the loading amount of Pt was 1.0 g with respect to 1 L of the support substrate.

Example No. 31

Except that, as a first zeolite powder, 100 parts of a ZSM-5 powder (ZSM5-2000: "HSZ890HOA" made by Tohso Co., Ltd., Si/Al ratio=2000) was used, a first zeolite powder loaded with Pt was prepared in the same manner as Example No. 28.

Whilst, an unloaded ZSM-5 powder (ZSM5-200: "HSZ870HOA" made by Tohso Co., Ltd., Si/Al ratio=200) was made into a second zeolite powder.

Then, they were coated in the same manner as Example No. 28, thereby preparing a catalyst of Example No. 31. The coating amount was 150 g with respect to 1 L of the support substrate, and the loading amount of Pt was 1.0 g with respect to 1 L of the support substrate.

Example No. 32

Except that, as a first zeolite powder, 100 parts of a ZSM-5 powder (ZSM5-200: "HSZ870HOA" made by Tohso Co., Ltd., Si/Al ratio=200) was used, a first zeolite powder loaded with Pt was prepared in the same manner as Example No. 28.

Whilst, an unloaded ZSM-5 powder (ZSM5-40: "HSZ840HOA" made by Tohso Co., Ltd., Si/Al ratio=40) was made into a second zeolite powder.

Then, they were coated in the same manner as Example No. 28, thereby preparing a catalyst of Example No. 32. The coating amount was 150 g with respect to 1 L of the support substrate, and the loading amount of Pt was 1.0 g with respect to 1 L of the support substrate.

Example No. 33

Except that, as a first zeolite powder, 100 parts of a type "Y" zeolite powder (USY400: "HSZ390HUA" made by Tohso Co., Ltd., Si/Al ratio=400) was used, a first zeolite powder loaded with Pt was prepared in the same manner as Example No. 28.

Whilst, an unloaded type "Y" zeolite powder (USY30: "HSZ370HUA" made by Tohso Co., Ltd., Si/Al ratio=30) was made into a second zeolite powder.

Then, they were coated in the same manner as Example No. 28, thereby preparing a catalyst of Example No. 33. The coating amount was 150 g with respect to 1 L of the support substrate, and the loading amount of Pt was 1.0 g with respect to 1 L of the support substrate.

Example No. 34

Except that, as a first zeolite powder, 100 parts of a type "Y" zeolite powder (USY400: "HSZ390HUA" made by Tohso Co., Ltd., Si/Al ratio=400) was used, a first zeolite powder loaded with Pt was prepared in the same manner as Example No. 28.

Whilst, an unloaded type "Y" zeolite powder (USY15: "HSZ360HUA" made by Tohso Co., Ltd., Si/Al ratio=15) was made into a second zeolite powder.

Then, they were coated in the same manner as Example No. 28, thereby preparing a catalyst of Example No. 34. The coating amount was 150 g with respect to 1 L of the support substrate, and the loading amount of Pt was 1.0 g with respect to 1 L of the support substrate.

Reference Example No. 14

Except that, as a first zeolite powder, 100 parts of a USY30 powder (USY30: "HSZ370HUA" made by Tohso Co., Ltd., Si/Al ratio=30) was used, a first zeolite powder loaded with Pt was prepared in the same manner as Example No. 28.

Whilst, an unloaded type "Y" zeolite powder (USY400: "HSZ390HUA" made by Tohso Co., Ltd., Si/Al ratio=400) was made into a second zeolite powder.

50 parts of this first zeolite powder with Pt loaded, 100 parts of the second zeolite powder, 180 parts of pure water, and 55 parts of a silica sol (solid content 35%) were mixed, and were stirred, thereby preparing a slurry. And, the slurry was coated in the same manner as Example No. 28, thereby preparing a catalyst of Reference Example No. 14. The coating amount was 150 g with respect to 1 L of the support substrate, and the loading amount of Pt was 1.0 g with respect to 1 L of the support substrate.

Reference Example No. 15

Except that, as a first zeolite powder, 100 parts of a ZSM-5 powder (ZSM5-40: "HSZ840HOA" made by Tohso Co., Ltd., Si/Al ratio=40) was used, a first zeolite powder loaded with Pt was prepared in the same manner as Example No. 28.

Whilst, an unloaded ZSM-5 powder (ZSM5-2000: "HSZ890HOA" made by Tohso Co., Ltd., Si/Al ratio=30) was made into a second zeolite powder.

50 parts of this first zeolite powder with Pt loaded, 100 parts of the second zeolite powder, 180 parts of pure water, and 55 parts of a silica sol (solid content 35%) were mixed, and were stirred, thereby preparing a slurry. And, the slurry was coated in the same manner as Example No. 28, thereby preparing a catalyst of Reference Example No. 15. The coating amount was 150 g with respect to 1 L of the support substrate, and the loading amount of Pt was 1.0 g with respect to 1 L of the support substrate.

Reference Example No. 16

Except that, as a first zeolite powder, 100 parts of a mordenite powder (Mor30: "HSZ660HOA" made by Tohso Co., Ltd., Si/Al ratio=30) was used, a first zeolite powder loaded with Pt was prepared in the same manner as Example No. 28.

Whilst, an unloaded mordenite powder (Mor203: "HSZ690HOA" made by Tohso Co., Ltd., Si/Al ratio=203) was made into a second zeolite powder.

50 parts of this first zeolite powder with Pt loaded, 100 parts of the second zeolite powder, 180 parts of pure water, and 55 parts of a silica sol (solid content 35%) were mixed, and were stirred, thereby preparing a slurry. And, the slurry was coated in the same manner as Example No. 28, thereby preparing a catalyst of Reference Example No. 16. The coating amount was 150 g with respect to 1 L of the support substrate, and the loading amount of Pt was 1.0 g with respect to 1 L of the support substrate.

Comparative Example No. 11

Except that, as a first zeolite powder, 100 parts of a ZSM-5 powder (ZSM5-40: "HSZ840HOA" made by Tohso Co., Ltd., Si/Al ratio=40) was used, a ZSM-5 powder loaded with Pt was prepared in the same manner as Example No. 41.

150 parts of this ZSM-5 powder with Pt loaded, 180 parts of pure water, and 55 parts of a silica sol (solid content 35%) were mixed, and were stirred, thereby preparing a slurry. And, the slurry was coated in the same manner as Example No. 41, thereby preparing a catalyst of Comparative Example No. 11. The coating amount was 150 g with respect to 1 L of the support substrate, and the loading amount of Pt was 1.0 g with respect to 1 L of the support substrate.

Comparative Example No. 12

Except that, as a first zeolite powder, 100 parts of a Mor30 powder (Mor30: "HSZ660HOA" made by Tohso Co., Ltd., Si/Al ratio=30) was used, a Mor30 powder loaded with Pt was prepared in the same manner as Example No. 41.

150 parts of this Mor30 powder with Pt loaded, 180 parts of pure water, and 55 parts of a silica sol (solid content 35%) were mixed, and were stirred, thereby preparing a slurry. And, the slurry was coated in the same manner as Example No. 41, thereby preparing a catalyst of Comparative Example No. 14. The coating amount was 150 g with respect to 1 L of the support substrate, and the loading amount of Pt was 1.0 g with respect to 1 L of the support substrate.

Comparative Example No. 13

Except that, as a first zeolite powder, 100 parts of a USY30 powder (USY30: "HSZ370HUA" made by Tohso Co., Ltd., Si/Al ratio=30) was used, a USY30 powder loaded with Pt was prepared in the same manner as Example No. 41.

150 parts of this USY30 powder with Pt loaded, 180 parts of pure water, and 55 parts of a silica sol (solid content 35%) were mixed, and were stirred, thereby preparing a slurry. And, the slurry was coated in the same manner as Example No. 41, thereby preparing a catalyst of Comparative Example No. 13. The coating amount was 150 g with respect to 1 L of the support substrate, and the loading amount of Pt was 1.0 g with respect to 1 L of the support substrate.

Evaluation Test

Each of the aforementioned catalysts was mounted in an exhaust system of a 2,400 c.c. in-line 4-cylinder diesel engine, the number of revolutions was kept constant at 3,600 rpm, the gas temperature was adjusted so that the gas temperature was 600° C. at the inlets of the catalysts by a load, and a durability test was carried out for 25 hours.

After the durability test, each of the catalysts was mounted in an exhaust system of the same engine as that of the durability test, respectively, as illustrated in FIG. 1, the number of revolutions was varied in the range of 750 rpm–1,500 rpm by varying the load, and the maximum HC and NOx conversions were measured, respectively, while adding a light oil into the exhaust gas in the range of 800–1,200 ppmC. The results are set forth in Table 4.

TABLE 4

| | Zeolite Support | | Max. Conversion (%) | |
|---|---|---|---|---|
| | 1st Zeolite | 2nd Zeolite | NOx | HC |
| E. #28 | Mor203 | Mor30 | 40 | 86 |
| E. #29 | Mor203 | Mor19 | 43 | 88 |
| E. #30 | ZSM5-2000 | ZSM5-40 | 38 | 85 |
| E. #31 | ZSM5-2000 | ZSM5-200 | 35 | 83 |
| E. #32 | ZSM5-200 | ZSM5-40 | 36 | 84 |
| E. #33 | USY400 | USY30 | 35 | 82 |
| E. #34 | USY400 | USY15 | 37 | 84 |
| R.E. #14 | USY30 | USY400 | 19 | 68 |
| R.E. #15 | ZSM5-40 | ZSM5-2000 | 21 | 71 |
| R.E. #16 | Mor30 | Mor203 | 22 | 73 |
| C.E. #11 | ZSM5-40 | — | 24 | 74 |
| C.E. #12 | Mor30 | — | 25 | 75 |
| C.E. #13 | USY30 | — | 22 | 70 |

It is understood from Table 4 that the catalysts of Example Nos. 48–50 were inferior to the catalysts of Example No. 33, Example No. 31 and Example No. 28, respectively, in terms of the NOx and HC purifying capability, and that they were even inferior to the catalysts of Comparative Example Nos. 11–13. This is believed to result from the arrangement that the molar ratios (Si/Al) of the first zeolites were so small that there occurred the granular growth of Pt by the changes in the zeolite structures during the durability test.

However, the catalysts of the other examples exhibited better results than the comparative examples in terms of both of the HC conversion and the NOx conversion. This effect is apparently resulted from the arrangement that the molar ratios (Si/Al) of the first zeolite loaded with Pt were larger than the molar ratios (Si/Al) of the second zeolite.

Namely, in accordance with the exhaust-gas-purifying catalyst of the present invention, since NOx contained in an oxygen rich exhaust gas can be purified efficiently, and since the durability of the NOx purifying performance is extremely good, it is possible to purify NOx stably for a long period of time.

What is claimed is:

1. A catalyst for purifying an exhaust gas, wherein the catalyst reducing and purifying nitrogen oxides in an oxygen rich atmosphere which contains oxygen more than necessary for oxidizing components to be oxidized in the exhaust gas by hydrocarbon (HC) adsorbed on a zeolite support, and wherein:

said zeolite support comprises a first zeolite loaded with at least a catalyst metal selected from the group consisting of Pt, Rh, Pd, Ir and Ag, and at least an alkali component selected from the group consisting of alkali metals and alkaline-earth metals, and a second zeolite free from loading a catalyst metal and an alkali component, wherein both the first zeolite and the second zeolite are mixed in a powdered state, and said first zeolite is ¼–½ by weight ratio of all zeolites.

2. The exhaust-gas-purifying catalyst set forth in claim 1, wherein said first zeolite has pores whose diameters are a predetermined value or less and said second zeolite has pores whose diameters exceed the predetermined value.

3. The exhaust-gas-purifying catalyst set forth in claim 2, wherein said predetermined value is 5.5 Å.

4. The exhaust-gas-purifying catalyst set forth in claim 1, wherein a molar ratio of silicon with respect to aluminum (Si/Al) is greater in said first zeolite than in said second zeolite.

5. The exhaust-gas-purifying catalyst according to claim 1, wherein a weight ratio of said first zeolite with respect to said second zeolite is ⅔–½.

6. An exhaust-gas-purifying catalyst, wherein the catalyst reducing and purifying nitrogen oxides in an oxygen rich atmosphere which contains oxygen more than necessary for oxidizing components to be oxidized in the exhaust gas by hydrocarbon (HC) adsorbed on a zeolite support, wherein said zeolite support comprises a first zeolite loaded with at least a catalyst metal selected from the group consisting of Pt, Rh, Pd, Ir and Ag, and a second zeolite free from loading a catalyst metal, a molar ratio (Si/Al) of silicon with respect to aluminum of the first zeolite is greater than that of the second zeolite by 150 or more, and both the first and the second zeolite are mixed in a powered state.

7. The exhaust-gas-purifying catalyst set forth in claim 6, wherein a weight ratio of said first zeolite with respect to said second zeolite is ⅔–½.

8. The exhaust-gas-purifying catalyst set forth in claim 6, wherein said first zeolite is mordenite exhibiting 200 or more, ZSM-5 exhibiting 1,000 or more, type "Y" zeolite exhibiting 400 or more, type "A" zeolite exhibiting 400 or more, ferrierite exhibiting 400 or more, or zeolite β exhibiting 200 or more by a molar ratio (Si/Al).

9. The exhaust-gas-purifying catalyst set forth in claim 6, wherein said first zeolite has pores whose diameters are a predetermined value or less, and said second zeolite has pores whose diameters exceed the predetermined value.

10. The exhaust-gas-purifying catalyst set forth in claim 9, wherein said predetermined value is 5.5 Å.

* * * * *